US012335714B2

(12) United States Patent
Fryer et al.

(10) Patent No.: US 12,335,714 B2
(45) Date of Patent: Jun. 17, 2025

(54) AUTOMOTIVE AUDIO SYSTEM TRANSDUCER

(71) Applicant: Sound United, LLC, Carlsbad, CA (US)

(72) Inventors: George Digby Fryer, West (GB); Matthew Lyons, York, PA (US); Bradley M. Starobin, Baltimore, MD (US)

(73) Assignee: Sound United, LLC, Carlsbad, CA (US)

(*) Notice: Subject to any disclaimer, the term of this patent is extended or adjusted under 35 U.S.C. 154(b) by 0 days.

(21) Appl. No.: 18/498,573

(22) Filed: Oct. 31, 2023

(65) Prior Publication Data

US 2024/0147175 A1 May 2, 2024

Related U.S. Application Data

(62) Division of application No. 17/526,569, filed on Nov. 15, 2021, now Pat. No. 11,838,740.

(60) Provisional application No. 63/113,572, filed on Nov. 13, 2020.

(51) Int. Cl.

| | |
|---|---|
| ***H04R 7/00*** | (2006.01) |
| ***H04R 1/02*** | (2006.01) |
| ***H04R 1/34*** | (2006.01) |
| ***H04R 5/02*** | (2006.01) |
| ***H04R 5/04*** | (2006.01) |
| ***H04S 1/00*** | (2006.01) |
| ***H04S 7/00*** | (2006.01) |

(52) U.S. Cl.

CPC ............... *H04S 7/30* (2013.01); *H04R 1/023* (2013.01); *H04R 1/025* (2013.01); *H04R 1/345* (2013.01); *H04R 5/02* (2013.01); *H04R 5/04* (2013.01); *H04S 1/007* (2013.01); *H04R 2430/00* (2013.01); *H04R 2430/01* (2013.01); *H04R 2499/13* (2013.01); *H04S 2400/13* (2013.01)

(58) Field of Classification Search

None

See application file for complete search history.

(56) References Cited

U.S. PATENT DOCUMENTS

| | | | |
|---|---|---|---|
| 5,133,017 | A | 7/1992 | Cain et al. |
| 6,925,426 | B1 | 8/2005 | Hartmann |
| 7,817,812 | B2 | 10/2010 | Polk, Jr. et al. |
| 9,049,534 | B2 | 6/2015 | Eichfeld et al. |

(Continued)

FOREIGN PATENT DOCUMENTS

| | | | |
|---|---|---|---|
| DE | 102009021673 | A1 | 11/2010 |
| WO | WO2009012501 | A2 | 1/2009 |

*Primary Examiner* — Duc Nguyen
*Assistant Examiner* — Assad Mohammed
(74) *Attorney, Agent, or Firm* — Knobbe, Martens, Olson & Bear, LLP

(57) ABSTRACT

A signal processing method and Automotive Audio System 290 comprising a tripolar loudspeaker configuration housed in at least one automotive head-rest assembly 200 or 500, whose radiation pattern, in conjunction with inter-element delays and other design features, is such that that passengers are afforded temporal and amplitude cues for achieving the desired soundfield appropriate for a variety of audio program material. Optionally, some or all of the headrest assembly transducers are aligned and configured with a Floating Waveguide member 470.

3 Claims, 10 Drawing Sheets

(56) References Cited

U.S. PATENT DOCUMENTS

| | | | | |
|---|---|---|---|---|
| 9,374,640 | B2 | 6/2016 | Starobin | |
| 9,426,576 | B2 | 8/2016 | Gladwin et al. | |
| 9,699,537 | B2 | 7/2017 | Oswald et al. | |
| 10,327,064 | B2 | 6/2019 | Starobin | |
| 10,730,423 | B2 | 8/2020 | Subat et al. | |
| 11,838,740 | B2 | 12/2023 | Fryer et al. | |
| 2008/0285762 | A1 | 11/2008 | Iwamoto et al. | |
| 2012/0045072 | A1* | 2/2012 | Matsuda | H04R 1/345 381/86 |
| 2014/0233747 | A1 | 8/2014 | Fox | |
| 2015/0172818 | A1* | 6/2015 | Gladwin | H04R 3/12 381/337 |
| 2015/0319549 | A1 | 11/2015 | Yanagawa | |
| 2017/0053636 | A1 | 2/2017 | Oswald et al. | |
| 2018/0279027 | A1* | 9/2018 | Peace, Jr. | H04R 1/025 |
| 2019/0193612 | A1 | 6/2019 | Oswald et al. | |
| 2019/0222926 | A1* | 7/2019 | Showalter | H04R 1/02 |
| 2020/0084538 | A1 | 3/2020 | Brown et al. | |
| 2022/0159396 | A1 | 5/2022 | Fryer et al. | |

* cited by examiner

AUTOMOTIVE AUDIO SYSTEM TRANSDUCER

PRIORITY CLAIMS AND RELATED APPLICATION INFORMATION

This application is a divisional of U.S. Non-Provisional application Ser. No. 17/526,569 filed Nov. 15, 2021, which claims the benefit of priority to related, commonly owned U.S. provisional patent application No. 63/113,572, filed Nov. 13, 2020, the entire disclosures of which are incorporated herein by reference. This application is also related to commonly owned U.S. Pat. Nos. 7,817,812 and 9,426,576, the entire disclosures of which are also incorporated herein by reference.

BACKGROUND OF THE INVENTION

Field

The present invention relates to automotive audio systems. More particularly, the disclosed developments relate to novel structures and methods for using audio system components in headrests with vehicle audio systems.

Discussion of the Related Art

Conventional vehicle audio systems do not adequately address the compromises between the driver's and passenger's desired listening experiences. Each occupant's place in a vehicle's interior presents distinct undesired seat and headrest sound interference issues. Some conventional vehicle systems attempt to balance these parameters using large headrests, where the front surface of the headrest serves as an acoustic radiator. However, the radiation patterns caused by this configuration can degrade inter-aural performance.

One more recent attempt to address these shortcomings is described and illustrated in U.S. Pat. No. 10,730,423, a portion of which is illustrated in this application's FIGS. 1A and 1B, which show a vehicle 80 having a plurality of seats 10, each having a headrest assembly 100. Prior art headrest assembly 100 includes a main body 110 having a front face (or surface) 120 and a pair of acoustic channels 130*a,b* formed partly by a side wall 140*a,b*. The side walls 140*a,b* have a front edge 150*a,b* that extends beyond the front surface 120 (that is, forward of the front surface 120 relative to the user's head position). The headrests assembly's main body 110 includes portions 160*a,b* configured to receive first and second electro-dynamic drivers or transducers 170*a,b*, respectively. The first transducer 170*a* and second transducer 170*b* are aimed forwardly on parallel axes which have a center-to-center spacing A (e.g., 200 millimeters (mm)). An acoustic seal 190*a,b* encloses the back of each of the first and second transducers 170*a,b*. The dimensions shown in Prior art FIG. 1A were said to be selected for favorable inter-seat isolation (i.e., the ratio of energy received by the seat's occupant to the energy received by other occupants). While thoughtful, the acoustic headrest assembly 100 of FIG. 1A was deemed inadequate for this applicant's vehicle headrest audio system application.

Prior art FIG. 1B depicts a vehicle audio system 90 configured for use in a multi-row vehicle cabin (e.g., as in a sport utility vehicle (SUV)). The cabin is shown having a plurality of rows (Rows A, B, C) of seats 10. Door-mounted transducers 20 (e.g., speakers) are shown along four doors 30 of the vehicle cabin. This is merely one illustration of a vehicle audio system 90 that can benefit from modifications including the audio system configurations and methods disclosed according to various implementations of the present invention, below. A conventional head unit control system 40 and an interface 50 are shown for illustrative purposes. Additional audio system components and subcomponents (e.g., a head unit with outputs to additional amplifiers, as well as additional speakers), along with connections (e.g., wired connections) between components are typically included in such conventional systems.

Typical automotive audio systems (like that shown in FIGS. 1A and 1B) subject passengers, especially the driver, to non-optimal sound radiating from a plurality of loudspeakers placed about the passenger compartment with insufficient regard for presenting a stable multi-channel soundfield.

Modern vehicles include audio systems which have also been awkwardly adapted to work with a wide variety of non-music communications and navigation systems, in addition to providing traditional audio program material (e.g., music) playback. So, for example, safety warnings and status messages, along with Nav/GPS driving directions often are poorly integrated into an ongoing audio presentation for the driver.

Presenting optimal audio for multiple passengers in an automobile's interior depends in part on establishing a priori the spatial relationship between the passengers' ears and the transducer elements generating the soundfield. Using conventional audio system configurations like that shown in FIGS. 1A and 1B with transducers 20 conventionally placed on door panels or the like has not presented a satisfactory soundfield simultaneously for the driver and the other passengers.

There is a need, therefore, for an automotive audio system which overcomes the shortcomings of the prior art and provides drivers and passengers with temporal and amplitude cues for achieving the desired soundfield appropriate for a variety of audio program material.

SUMMARY

The present disclosure describes an improved automotive audio system which incorporates a novel tripolar loudspeaker configuration housed in an automotive head-rest assembly whose radiation pattern, in conjunction with inter-element delays and other design features, is such that each of the passengers is afforded temporal and amplitude cues for achieving a much more desirable, effective and satisfying soundfield which, in use, is appropriate for a wider variety of audio program material. In accordance with the method of the present invention, delivered sound is tailored or processed for each of the vehicle's occupants (e.g., driver vs passengers, front seat vs rear).

The system and method of the present invention adopts a novel approach to provide optimized audio for each of the multiple passengers in a motor vehicle by embedding specially configured and aimed loudspeaker drivers in the headrest assemblies. In a current prototype embodiment, each front seat headrest (e.g., in Row A) includes three or more loudspeakers in a particular physical configuration now designated the "tri-polar array". Two full-range or mid-tweeter transducers are placed on or in a front headrest surface near the outer, lateral extremes of the headrest such that they are proximate to a seated individual's ears while a third mid-bass or full-range driver is located on the rear face of the headrest, substantially oriented towards back-seat passengers (e.g., in row B). Preferably, the rear facing transducer in each array is oriented at an upward tilt of a selected angle (e.g., 30-45 degrees) for purposes of promoting psycho-acoustically invoked height effects. The audio signal provided to drive the rear facing upwardly tilted transducers is subjected to HRTF compensating signal processing to provide enhanced height effects.

In a promising prototype of the system and method of the present invention, the Digital Signal Processing ("DSP") method steps include:

(a) Imposing a front to rear synchronization interval time delay on each front headrest's front/lateral driver pair in accordance with the physical separation of the front/lateral drivers, most precisely their acoustic centers, and the rear facing driver. By so synchronizing the front and rear oriented sound radiation, the amplitude response at the passengers' ears is substantially smoother through the crossover passband than it would be otherwise. The time delay value is computed from the formula $$t\text{ (u-sec)}=[d\text{ (mm)}/343]\times 10^{6} \qquad \text{(Eq. 1)}$$

For example, for a separation distance of 50 mm (approx. 2.0 in) between the planes of the front/lateral and rear drivers' acoustic centers, a delay of 146 micro-seconds imposed on the front/lateral drivers was found to substantially synchronize the front/lateral drivers with the rear-facing drivers for a front-seat passenger. For other sizes of the tri-polar headrest assembly of the present invention, the front to rear synchronization interval is in the range of 100 to 600 microseconds.

(b) Another signal processing step in the DSP method of the present invention is Adjusting and optimizing front/rear delay distinctly for front or rear passengers, wherein the adjustment includes optimizing drive signals for:

(b1) the front/lateral transducer(s), optionally with (b2) the rear facing transducer(s), and (b3) generating and applying separate or additive delays to be imposed in accordance with where other speakers placed about a given vehicle's passenger compartment to optimize front or rear seat passenger's experience with respect to audio performance. In particular, low-frequency transducers/sub-systems (e.g. subwoofers) are located relatively far from the passenger and the associated headrest audio sub-system. In order to synchronize the time of arrival of said loudspeaker sub-systems' acoustic radiation, appropriate delays are imposed on elements of the headrest loudspeaker system in accordance with acoustic (time of arrival) synchronization and providing optimal temporal/spatial cues for optimal imaging at each listener's location.

Further (optional) signal processing steps in the DSP method of the present invention include optimizing the aimed radiation pattern of headrest transducers with waveguides and/or acoustic absorption elements (and accounting for those aimed radiation patterns in the DSP) and generating, for the listener in the driver's seat, selected Nav/GPS directional cues which are played through selected transducers into at least one of that driver's selected ears (e.g. "turn left" shall be directed to the driver's left ear) while other occupants enjoy uninterrupted audio. The DSP method of the present invention optionally includes Interaural cross-talk cancellation (IACC) techniques for reducing the sound at the ear locations of the opposing headrest speaker's acoustic output to further enhancing spatial cues, especially for NAV/GPS prompts. For example, a "turn left prompt" presented to the driver's left ear would, in the absence of IACC, would "leak" to the right rear thereby diminishing the intended "hard left" spatial aspects of the prompt. By introducing an attenuated, phase inverted replica to the right ear with an appropriate time delay in accordance the distance between the driver's ears, the intended left-ear spatial cue may be greatly enhanced. Additional processing on the IACC "effect" can (for example) include bandpass filtering to substantially include the 400-4 kHz decade. There are other signal processing options for creating filtered, delayed (phase adjusted) signals which can be projected to acoustically combine or be superposed in the space of the vehicle's interior to create selected phantom sonic images for selected passengers, as different vehicle audio system applications may require (see, e.g., Polk Audio's U.S. Pat. Nos. 9,374,640 and 10,327,064, the entire disclosures of which are incorporated herein by reference).

The DSP settings and configuration for each tri-polar headrest assembly are selectively optimized for each of the front seat occupant or rear seat passengers. For example, optimizing for the front seat passenger entails appropriate amplitude response settings for that passenger, including inverse head related transfer functions associated with height effects and/or headrest sound absorption and diffraction. By comparison, when the front headrest's rear oriented loudspeaker is serving the rear passengers, alternative amplitude shaping is imposed. Finally, for the ultimate ("limo mode") rear seat experience, the outer front oriented loudspeakers each play an appropriate cancellation signal (phase reversed, attenuated and bandpassed) to effectively provide a center-located phantom center channel for each rear seat passenger.

In a preferred embodiment, some or all of the transducers incorporated into each headrest assembly incorporate a floating waveguide member aligned along the transducer's central excursion axis which is coaxially aligned with that driver's aiming axis. When properly aligned in the manner discovered in applicants' prototype development work, the aimed radiation pattern of each headrest transducer and the system's frequency response are improved and lower distortion near field reproduction is provided.

The above and still further features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Turning now to FIGS. 2-7, the automotive audio system 290 of the present invention preferably incorporates a plurality of headrest assemblies (e.g., 200 or 500), each having a tripolar loudspeaker configuration which generates sound aimed along three distinct axes. Each automotive head-rest assembly 200 generates a selected three axis radiation pattern, which, in conjunction with selected inter-element delays and other design features, provides each passenger with temporal and amplitude cues for achieving a much more desirable effective and satisfying soundfield that is also appropriate for a wider variety of audio program material for an automobile's occupants.

In accordance with the method of the present invention, delivered sound is tailored or processed for each of the vehicle's occupants (e.g., driver vs passengers, front seat vs rear) as described further below (and illustrated in FIGS. 6A-6E).

Figure 1A:
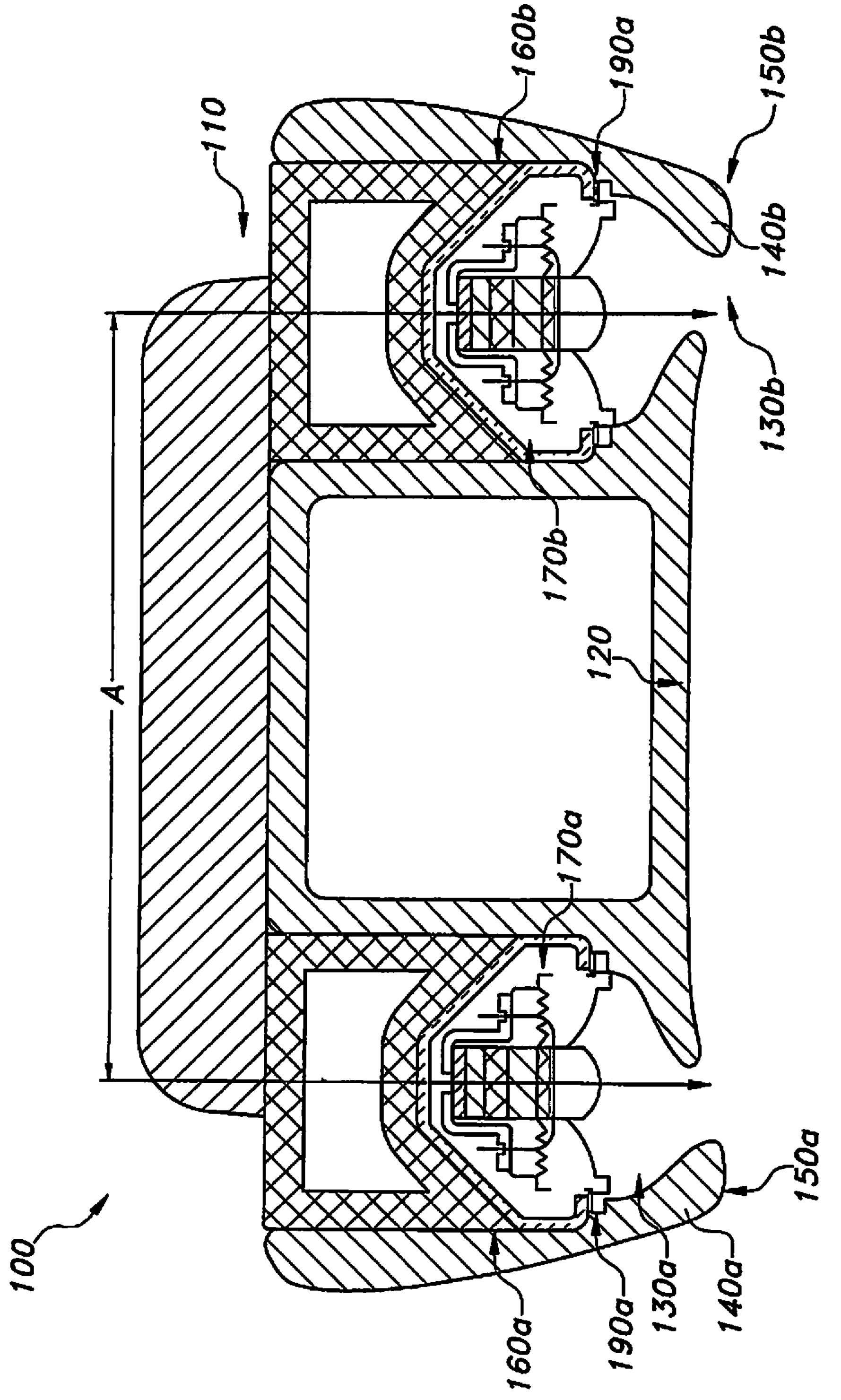
FIG. 1A (PRIOR ART)
FIGS. 1A and 1B describe and illustrate automotive audio system configurations and components, in accordance with the prior art.
Figure 1B:
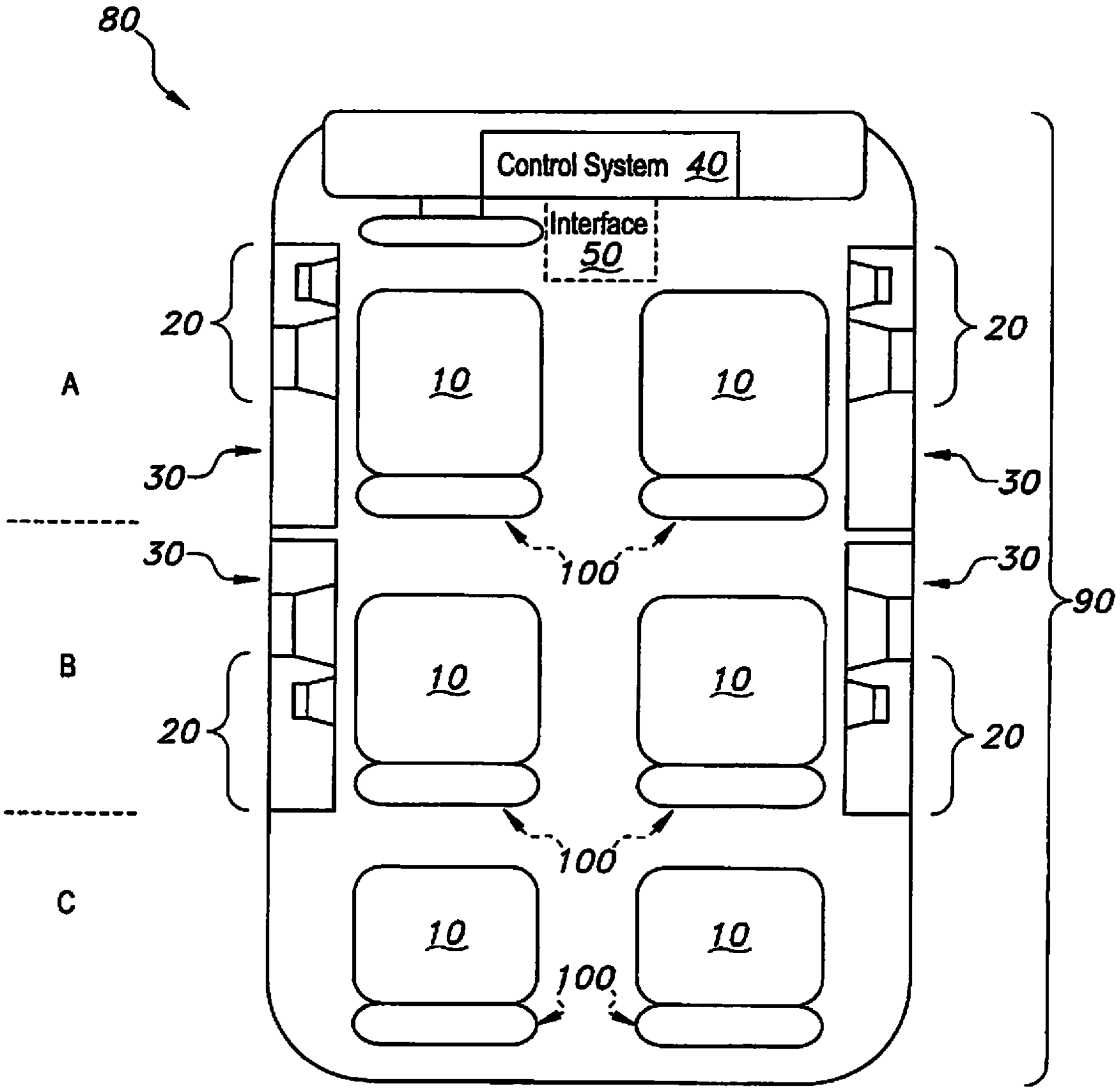
FIG. 1B (PRIOR ART)
Figure 2:
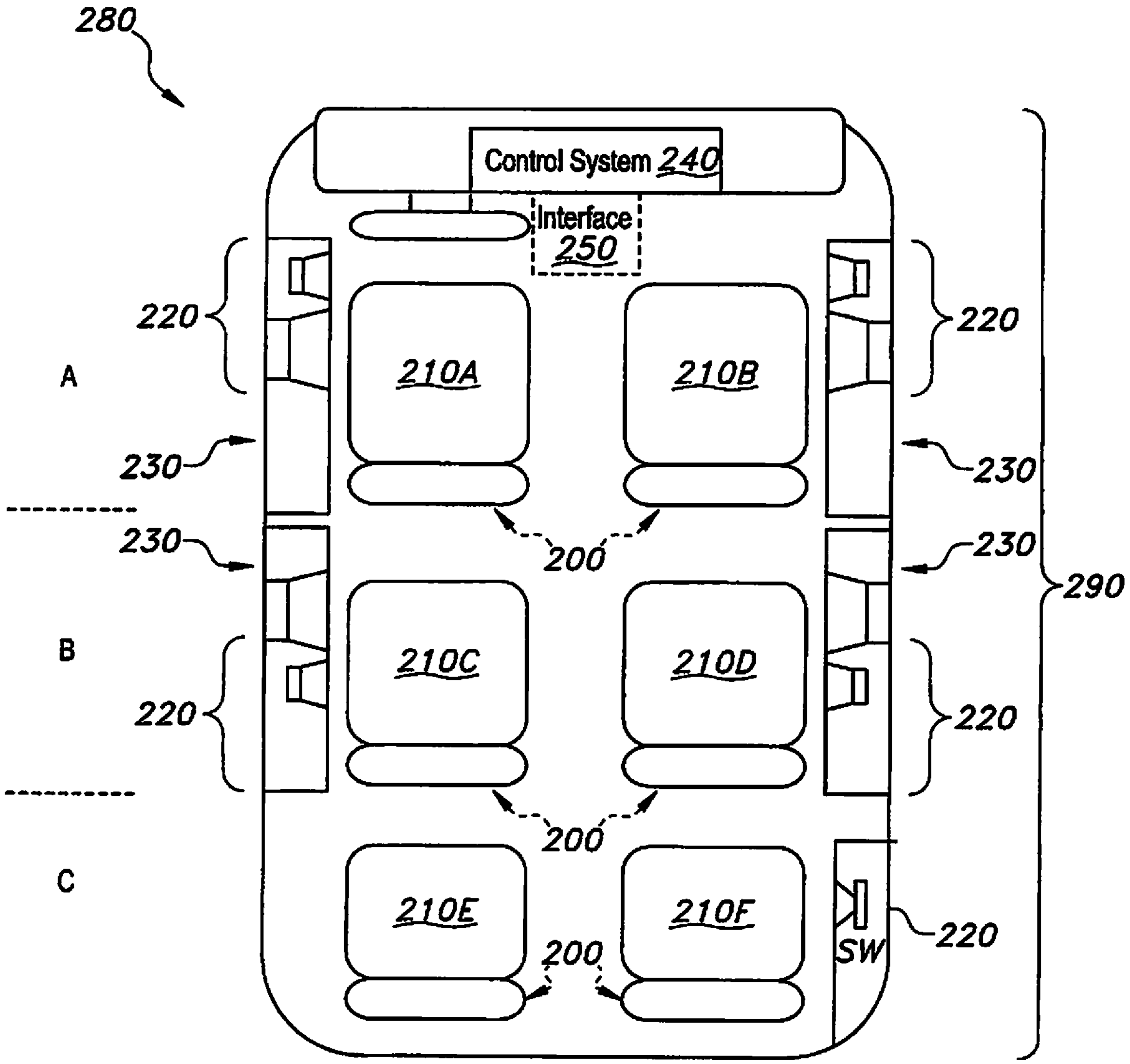
FIG. 2 is a diagram illustrating a plan view of the automotive sound system configuration and method of the present invention.

FIG. 2 is a schematic depiction of the vehicle audio system of the present invention 290 in a multi-row vehicle cabin, e.g., such as in a wagon, mini-van or sport utility vehicle (SUV) 280. The cabin is shown having a plurality of rows (Rows A, B, C) of seats 210. The driver's seat 210A is shown in Row A, on the left. Optional conventional door-mounted transducers 220 (e.g., speakers) are shown along four doors 230 of the vehicle cabin. This is merely one illustration of a vehicle audio system 290 that can benefit from the audio system configurations and methods disclosed according to various implementations of the present invention, below. A head unit and control system 240 is configured with an interface 250 to implement the signal processing method steps of the present invention and is shown as being incorporated into the dash or console for illustrative purposes. The audio system of the present invention may include additional components and subcomponents (e.g., head unit controlled amplifiers, as well as additional speakers), along with connections (e.g., wired connections) between components as typically included in such systems, but those are omitted from this illustration for conciseness.

Figure 3:
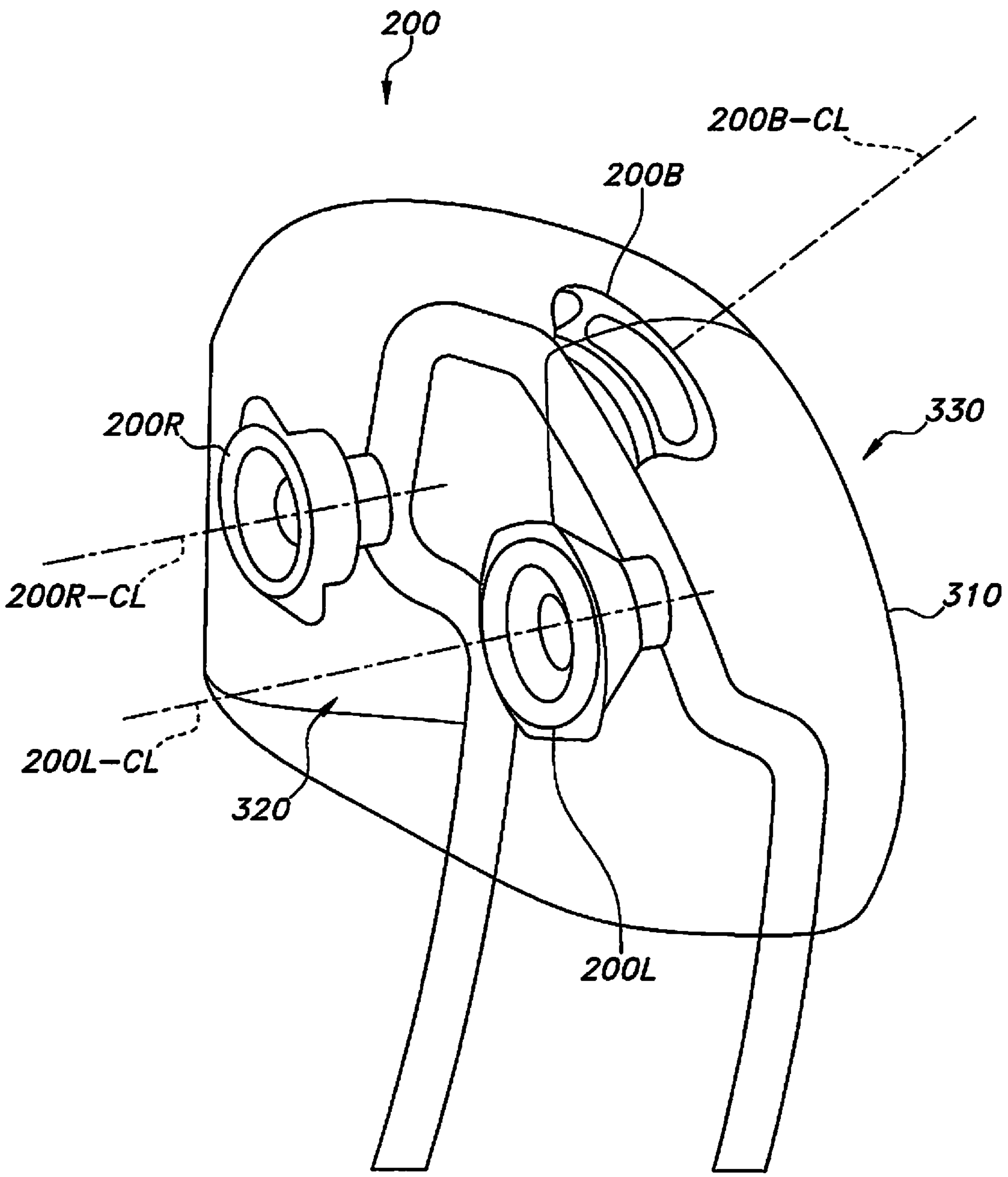
FIG. 3 is a perspective view illustrating the orientation of components for a first embodiment of the automotive sound system headrest and method of the present invention.

The automotive audio system 290 and method of the present invention achieve optimal audio for each passenger in motor vehicle 280 by aiming three specially configured electrodynamic loudspeaker drivers (200R, 200L, 200B) outwardly from the headrest (see, e.g., as shown in FIG. 3) along three radially arrayed axes. More specifically, first, second and third transducers (200R, 200L, 200B) are supported within and aimed from the illustrated automotive head-rest body 310 along first, second and third transducer aiming axes (200R-CL, 200L-CL and 200B-CL). In the exemplary illustrated embodiment, each front seat headrest assembly (e.g., 200) includes three or more loudspeakers in the configuration now designated the "tri-polar" array, since each transducer is aimed along it's own distinct aiming axis. First and second full-range or mid-tweeter transducers (200R, 200L are placed near the outer, lateral extremes of the front surface 320 of headrest assembly 200 such that they are proximate to a seated individual's right and left ears respectively while a third mid-bass or full-range driver (200B) is located on the rear face 330 of the headrest, substantially oriented towards back-seat passengers (e.g., seated in row B).

Preferably, the rear facing transducer 200B in each headrest assembly's array is oriented at or aimed along an upwardly tilting aim axis of a selected angle (e.g., 30-45 degrees) above a horizontal plane for purposes of promoting psycho-acoustically invoked height effects, which combined with signal processing to provide audio-signal response shaping derived from head-related transform functions (HRTFs).

Headrest assembly 200 includes a main body 310 having a front face (or surface) 320 and optionally defines or includes a pair of directivity enhancing acoustic channels formed therein. The main body 310 includes structure proximate front surface 320 to receive, support and aim first and second transducers (200R, 200L) which have a selected center-to-center spacing. The main body 310 also includes structure proximate rear or back surface 330 to receive, support and aim the third, back-facing transducers (200B) preferably along the selected upwardly tilted aiming axis.

Figure 4A:
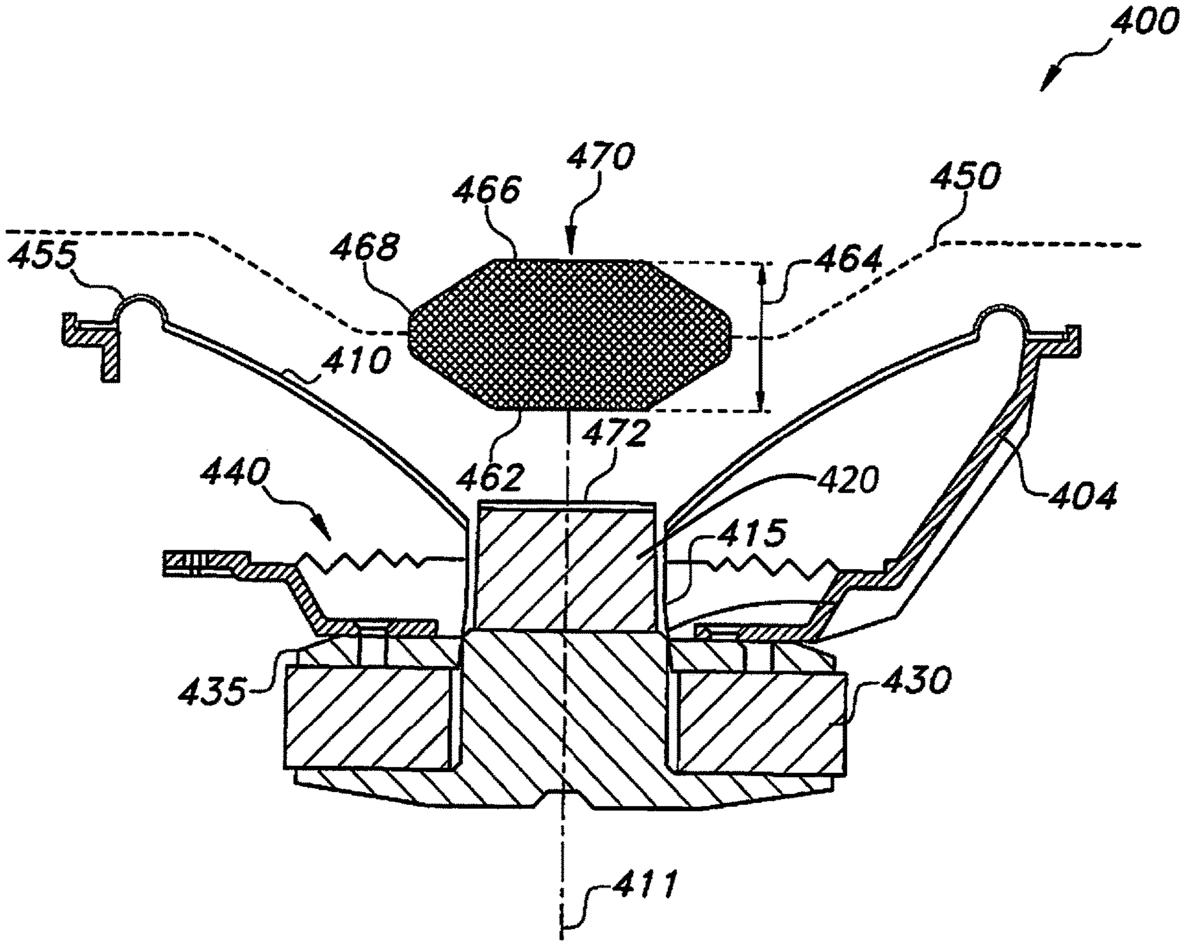
FIG. 4A is a diagram in partial cross section illustrating a preferred embodiment of an electrodynamic loudspeaker driver or transducer configured with a novel structure supporting a Floating Waveguide before the transducer's cone or diaphragm in an orientation which was discovered to partially occlude and optimize the radiation pattern of the transducer, in accordance with the structure and method of the present invention.

Turning next to FIG. 4A, a preferred embodiment for the headrest loudspeaker drivers in the tri-polar array (e.g., oriented generally as 200R, 200L, 200B) is illustrated in cross section, which shows the placement and configuration of the driver's Floating Linear Response Waveguide ("FLRW") structure 470 which separate from but aligned and supported in a floating orientation over the driver's central axis of excursion which is then preferably coaxially aligned with that driver's aiming axis. FLRW transducer 400 is in some respects similar to the structure illustrated in commonly owned U.S. Pat. No. 9,426,576 (the entire disclosure of which is incorporated herein by reference) but with important differences. FLRW transducer 400 is an electrodynamic acoustic transducer with a cone-shaped diaphragm 410 suspended to oscillate within a frame 404 supporting a short central pole piece 420 and a magnetic circuit assembly. These elements are aligned behind or under an acoustically transparent mesh or grill structure 450 which is integrated into a selected surface (e.g., headrest front surface 320) of headrest assembly 200 and defines part of the acoustic channel which directs the transducer's sound outwardly from the headrest surfaces. A FLRW member 470 resembling the bulbous waveguide tip in commonly owned U.S. Pat. No. 9,426,576 is not supported by the pole piece 420 and is instead supported circumferentially by and floats within, is integrally mounted into, or is proximate an acoustically transparent mesh or grill surface 450 and is centered along the central aiming or excursion axis 411 of driver 400, in an orientation which is coaxial with that transducer's aiming axis 411. FLRW member 470 was discovered to be surprisingly effective at absorbing or blocking and reducing or eliminating high frequency distortions caused by destructive interference within the transducer.

The bulbous FLRW member structure 470 is spaced distally in front of pole piece distal surface 472 and clears the moving parts of the transducer and minimizes diffraction of sound energy, extending forward approximately to the plane defined by the outer periphery of the diaphragm when the diaphragm and voice coil are at rest. The FLRW waveguide member 470 extends radially outward above the central radiating area of the transducer diaphragm or cone 410 and obscures or partially occludes the center portion of the transducer's cone or diaphragm. The illustrated orientation of the novel acoustically transparent but substantially rigid supporting mesh or grille structure 450 supports the Floating Waveguide member 470 in an axially centered but spaced orientation before the transducer's cone or diaphragm; this orientation and spacing which was discovered to partially occlude and optimize the linearity of the frequency response and radiation pattern of the transducer assembly. FLRW equipped transducer assembly 400 is described and illustrated in the manner developed for use in automotive interiors, both for use in a tripolar headrest assembly 500 or in another portion of the automotive audio system 280 such as door mounted speakers 220.

Persons of skill in the art will appreciate that in some respects, FLRW equipped transducer assembly 400 is an improvement over applicant/owner's prior work in commonly owned U.S. Pat. No. 9,426,576, the entirety of which is also incorporated herein by reference, in that an electrodynamic loudspeaker transducer's electro-motive motor components (e.g., voice coil and magnetic gap structures) and diaphragm are included in the developments of the present invention.

More specifically, referring again to FIG. 4A, efficiency requires a diaphragm which is both strong and light weight. Strength and light weight is typically achieved using a truncated cone shaped diaphragm (e.g., 410) with the minor diameter of the cone inside the transducer and the major diameter (flare or mouth) of the cone pointed out or distally towards the distal end or front of the transducer. The cone shaped diaphragm may have straight or curved sides. The depth of the cone is such that at high frequencies the center of the cone may be ½ wavelength of sound deeper than the cone periphery, thereby causing undesirable destructive interference. The destructive interference is frequency dependent, resulting in uneven frequency response, reduced efficiency, and audible distortion of the sound. FIG. 4A illustrates in cross-section that electrodynamic acoustic transducer 400 includes a cone or diaphragm 410 attached at the periphery of its center opening to a voice coil 415, so that movement of the voice coil 415 translates into movement of the diaphragm 410. The voice coil 315 is disposed on and is capable of moving along a cylindrical pole piece 420 along central or aiming axis 411.

In the illustrated embodiment, pole piece 420 is integrated with a back plate (or base) and permanent magnet 430 provides the static magnetic field in which the voice coil 415 moves. A front plate 435 is disposed on the magnet 330, so that the magnet 430 is located between the back plate and the front plate 435, all of which are symmetrically aligned along aiming axis 411. Front plate 435 and pole piece 420 are preferably made and configured so that the flux of the static magnetic field emanated by the magnet 430 is focused (concentrated) in the gap between the front plate 435 and the pole piece 420. The voice coil 415, and particularly the portion of the voice coil 415 with the wire windings, can move along the pole piece 420 distally (up) and proximally (down, as the directions appear in FIG. 4B) under influence of Lorentz electromotive forces created by the interaction of the static magnetic field within the gap and the variable current flowing through the windings of the voice coil 415. The movement of the voice coil 415 is transferred in a substantially linear manner to the diaphragm 410 through the diaphragm's central neck area which is attached to the former of the voice coil. Movement of the diaphragm 410 generates and radiates sound waves in response to the variations in the current driving the wire windings of the voice coil 415 and resonances of the diaphragm 410 are terminated or reflected at the neck area.

Figure 4B:
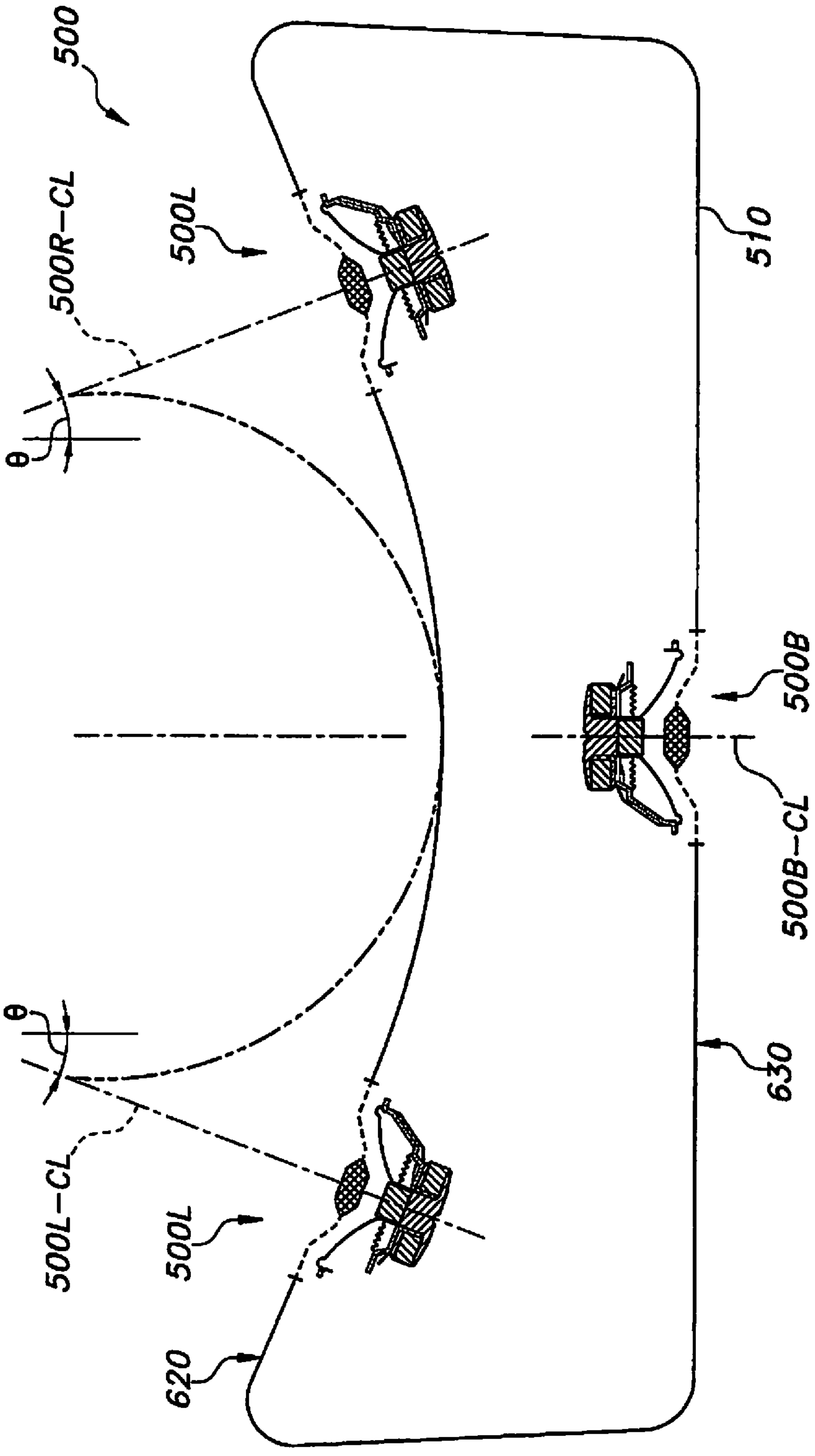
FIG. 4B is a diagram in partial cross section illustrating a preferred embodiment of the automotive sound system's headrest assembly including first, second and third uniquely aimed Floating Waveguide equipped headrest transducers (e.g., as illustrated in FIG. 4A) in accordance with the structure and method of the present invention.

In addition to the flared conical shape of the diaphragm 410 illustrated in FIG. 4B, the diaphragm may assume various other shapes. In some embodiments, for example, the diaphragm 410 is an exponential flare or has a straight-sided conical shape. The diaphragm 410 may be made from various materials, as desired for specific performance characteristics and cost tradeoffs of the transducer 400. In some embodiments, for example, the diaphragm 410 is made from paper, composite materials, plastic, aluminum, and combinations of these and other materials (this list is not all-inclusive). An annular spider 440 is attached at its outer periphery to a middle portion of frame 404. The inner periphery of the spider 440 is attached to the upper end of the voice coil 415, below the diaphragm 410. In this way, the spider 440 provides elastic support for the voice coil 415, aligning and centering the voice coil 415 on the pole piece 420 in both radial and axial directions.

The frame 404, otherwise known as a "chassis" or "basket," is used for supporting and aligning the above described moving components of transducer 400, and also supports the transducer 400 for mounting within headrest assembly 500 or door mounted speaker assembly 220. It may be made from metal or another material with sufficient structural rigidity. In the transducer 400, the frame 404 and front plate 435 are held together with bolts, while the front plate and back plate are attached to the magnet 430 with glue, e.g., epoxy. In some alternative embodiments, all these components are attached with glue or with one or more bolts. Other suitable attachment methods and combinations of methods may also be used for attaching these components to each other. An outer roll seal 455 connects the outer periphery of the diaphragm 410 to an upper lip of the frame 404. The outer roll seal 455 is flexible to allow limited movement of the outer periphery of the diaphragm 410 relative to the stationary frame 404 and the stationary grill member 450 which supports stationary waveguide member 470. The dimensions of the outer seal 355 are such that it allows sufficient movement to accommodate the designed peak-to-peak excursion of the diaphragm 410 and the voice coil 415. In cross-section, the outer seal 355 may be arch-like, for example, semi-circular, as is shown in FIG. 4A. It should be noted, however, that the invention is not necessarily limited to transducers with outer seals having arch-like cross-sections, but may include transducers with sinusoidal-like and other outer seal cross-sections. The material of the outer seal 455 may be chosen to terminate unwanted resonances in the diaphragm 410. The outer seal 455 may be made, for example, from flexible plastic, e.g., elastometric material, multi-layered fabric, impregnated fabric, or another material.

Referring next to the space between the distal surface 472 of pole piece 420 and the rearward or proximal underside surface 462 of waveguide member 470, a gap or cavity is defined by the cylindrical volume of air in front of the pole piece surface 472. Waveguide member 470 covers or occludes a substantial portion of that gap or cavity (defined by the cylindrical volume of air in front of the pole piece surface 472). By absorbing or attenuating sound within the cylindrical cavity of air before the pole piece's central surface 472, the waveguide member 470 absorbs and attenuates destructive interference and reduces distortions in the audio response of the transducer 400. The shape of the waveguide structure 470 clears the moving parts of the transducer 400 at maximum excursions and minimizes (reduces) diffraction of sound energy. Waveguide structure 470 is axially aligned with aiming axis 411 and suspended or supported to spread laterally or radially within the plane defined by the outer periphery of the diaphragm 410 when the voice coil 415 is at rest; and extends radially outward above the central radiating area of the cone 410 so as to obscure the center portion of the diaphragm. In the embodiment illustrated in FIGS. 4A and 4B, the floating or suspended waveguide structure 470 is configured as a suspended bulbous member having a proximal smaller diameter circular surface 462 separated by a waveguide member axial thickness 464 from a distal smaller diameter circular surface 466, with a central larger diameter central segment defining a larger diameter peripheral edge 468. In the embodiment illustrated in FIG. 4A, acoustically transparent grill or mesh 450 member engages and supports waveguide member 470 preferably at the larger diameter peripheral edge 468. Other shapes of the waveguide structure 470 also fall within the subject matter of the present invention. In this embodiment, as noted above, the bulbous waveguide member 470 has a larger diameter than the pole so that it partially obscures direct sound emanating from the center radiating area of diaphragm 410. The waveguide's bulbous member 470 may be made of any appropriate acoustically damped material and with any profile or shape, solid or hollow, smooth or rough, soft or hard, continuous or discontinuous surface as required to prevent short wavelength sound from the center of the diaphragm 410 from destructively interfering with short wavelength sound from the periphery of the diaphragm.

Referring again to FIG. 4A and also to FIG. 4B, FLRW equipped electrodynamic acoustic transducer 400 is configured for use in a loudspeaker system (e.g., in headrest assembly 500, as illustrated in FIG. 4B) and comprises a short pole piece with a first or exposed distal end 472 aligned along a radiation axis for the driver; a voice coil comprising wire windings configured to receive electrical current, the voice coil being configured to move along the first end of the pole piece; a magnetic structure comprising parts defining an air gap, wherein the voice coil on the first end 472 of the pole piece is disposed in the air gap so that the magnetic structure creates a magnetic field in which the voice coil is configured to move along the first end of the pole piece; a first diaphragm comprising an inner periphery defining a central opening and an outer periphery, the inner periphery of said first diaphragm being attached to the voice coil to move with the voice coil. The FLRW member 470 is aligned along the radiation axis and floats above but is not connected to the first end 472 of the pole piece and that FLRW member 470 projects radially to a larger diameter than the pole to project laterally over the inner radiating area of the first diaphragm. FLRW member 470 is configured to substantially attenuate or absorb high frequency sound radiation from the central portion of the cone or diaphragm. FLRW member equipped transducer 400 optionally has an inner flexible roll seal incorporated into the diaphragm's inner periphery. Optionally, FLRW member 470 is porous and comprises a portion that reduces in diameter in a smooth arc. The FLRW equipped driver 400 has an optimized the aimed radiation pattern and frequency response, as compared to prior art headrest mounted driver assemblies.

Returning to FIGS. 4A and 4B, FIG. 4A is a diagram in partial cross section illustrating a preferred embodiment of the radiation pattern optimized automotive sound system headrest transducer 400, and that driver configuration is integrated as shown in FIG. 4B wherein tri-polar headrest assembly 500 includes a main body 510 having a front face (or surface) 620 which supports and aligns or aims first and second directivity enhancing acoustic structures formed therein. The main body 510 of tri-polar headrest assembly 500 includes structure proximate front surface 620 to receive, support and aim first and second transducers (500R, 500L) along first and second selected aiming axes (500R-CL and 500L-CL) which have a selected center-to-center spacing (e.g., 20-40 cm, and preferably 30 cm) and a selected inward acute aiming angle θ (e.g., 10-30 degrees, and preferably 20 degrees). The main body 510 also includes structure proximate rear or back surface 630 to receive, support and aim a third, back-facing transducer (500B) along its own aiming axis (500B-CL) preferably along a selected upwardly tilted angle (e.g., 35 degrees, not shown).

Figure 5:
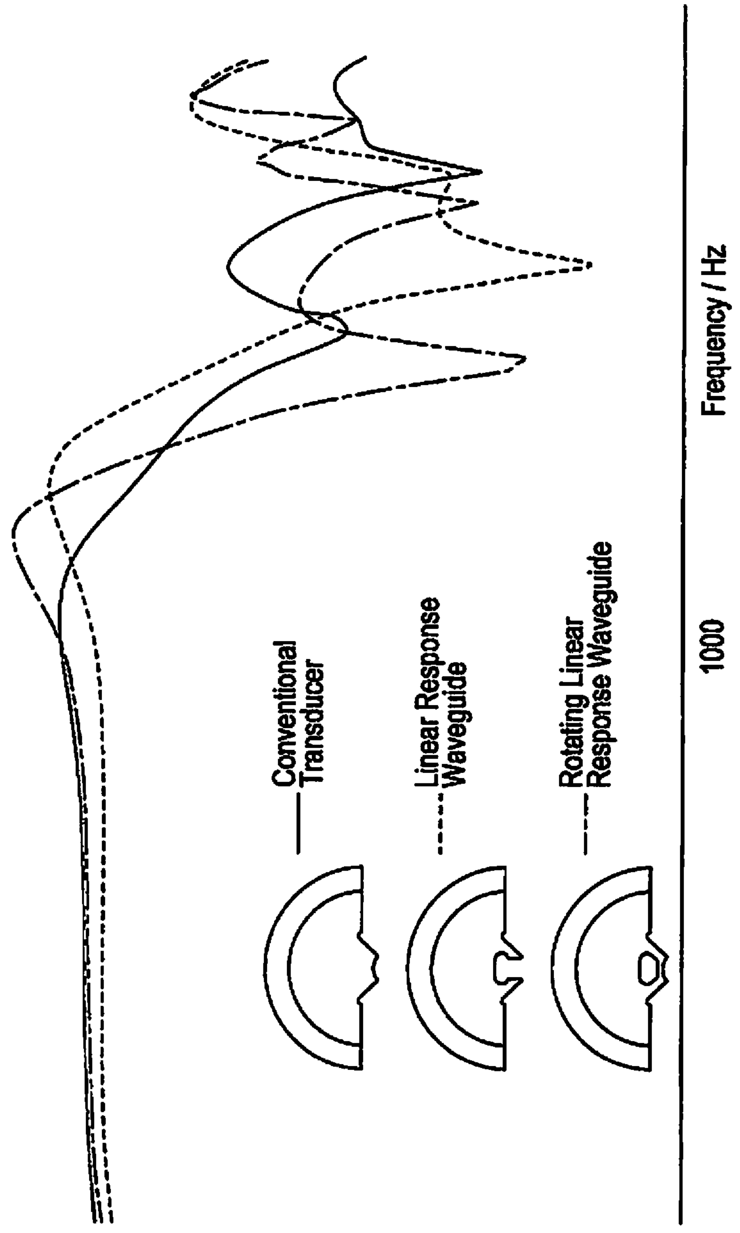
FIG. 5 is a frequency response plot and diagram illustrating the enhanced aimed radiation pattern and frequency response of the headrest transducers of the automotive sound system configuration and method of FIG. 4, in accordance with the present invention.

FIG. 5 is a frequency response plot showing amplitude response over the range of desired frequencies for a conventional dynamic driver, a driver having the pole piece waveguide extension mounted bulbous linear response waveguide tip (e.g., driver 300 from commonly owned U.S. Pat. No. 9,426,576), and new driver assembly 400 with the LRW waveguide member 470, in accordance with the present invention. Driver assembly 400 provides an optimized on-axis frequency response (e.g., for each seated listener's ear) and an enhanced aimed radiation pattern for each headrest transducer (e.g., in a tripolar headrest assembly 200 or 500).

FIGS. 6A-6D are diagrams illustrating four modes in accordance with the use and signal processing method of the present invention. In each diagram, a tri-polar headrest assembly (e.g., 200 or 500) is illustrated as viewed from above, looking down, so that front surface 320 aims the first and second transducers (200R, 200L) frontwardly and rear surface 330 aims the third, back transducer (200B) rearwardly. FIG. 6E is a process flow diagram illustrating an exemplary embodiment of process steps used in controlling the automotive audio system's components (e.g., for headrest assembly 200 or 500) when operating in the modes illustrated in FIGS. 6A-6D, in accordance with the method of the present invention.

Figures 6A, 6B, 6C, 6D:
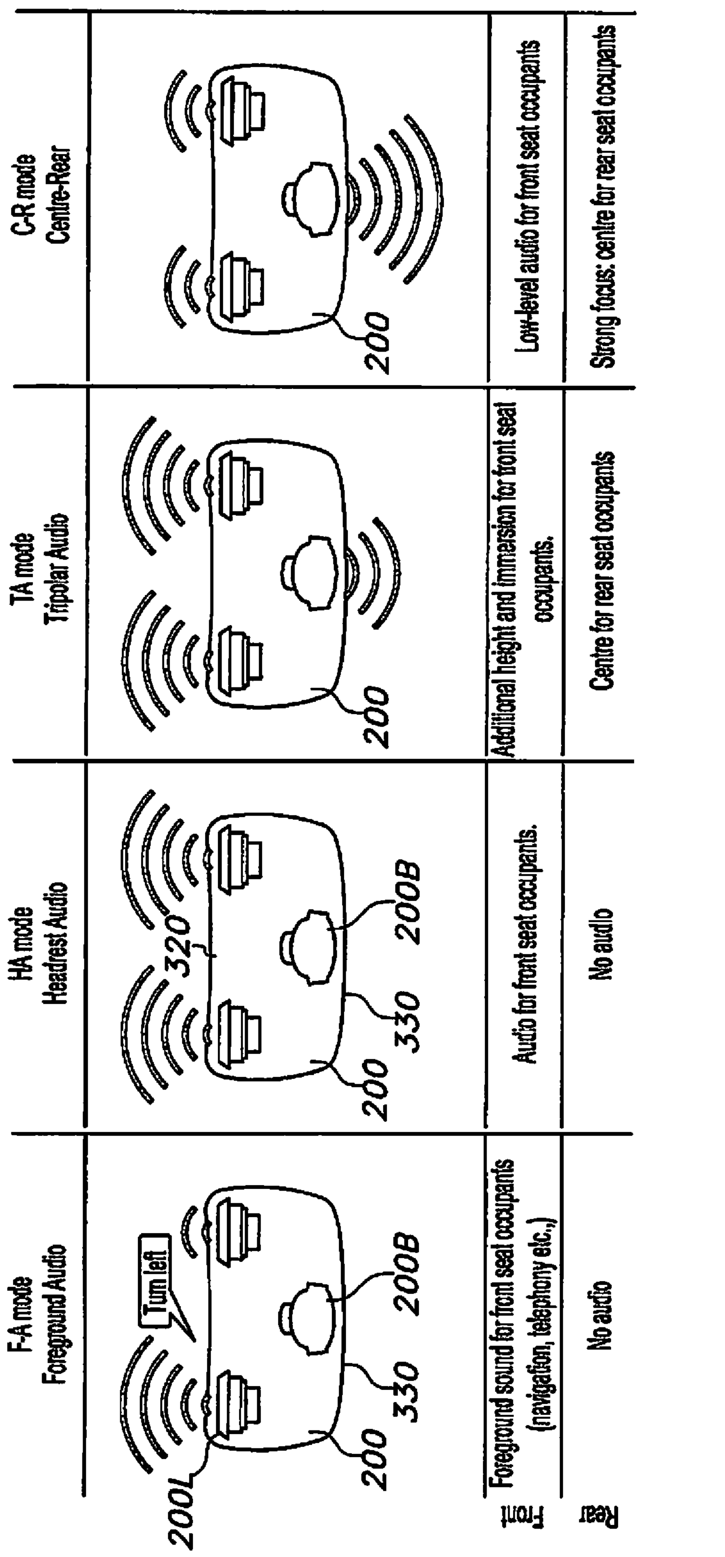
FIGS. 6A-6D are a sequence of diagrams illustrating selected system drive signals for selected use cases or situations for the automotive sound system configuration and method of the present invention.
Figure 6E:
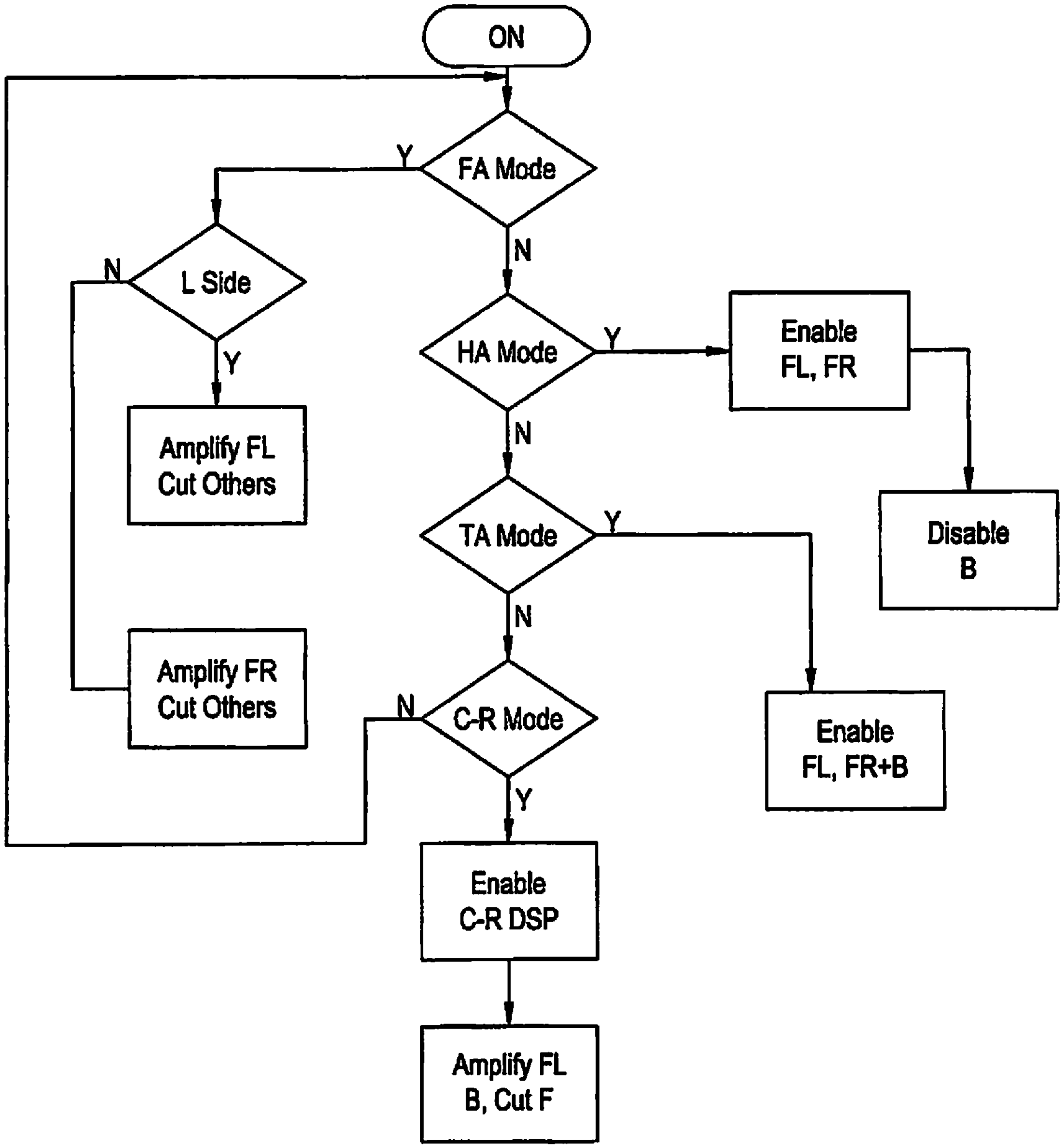
FIG. 6E is a process flow diagram illustrating an exemplary embodiment of process steps used in controlling the automotive audio system's components when operating in the modes illustrated in FIGS. 6A-6D, in accordance with the method of the present invention.

In FIG. 6A, when audio system 290 is used in a GPS or navigation mode (or for telephony), a selected front transducer is selected to provide sound at a greater volume into one of the driver's ears (e.g., transducer 200L aimed at the driver's left ear, when announcing "turn left") and the back speaker 200B receives no signal. The use case or mode illustrated in FIG. 6A is called the "Foreground Audio" mode.

FIG. 6B illustrates the "Headrest Audio" mode in which both front transducers (200R, 200L) play equally loudly, providing audio for the front seat occupants and no audio signal is provided for the rear-facing speaker 200B. FIG. 6C illustrates the mode called "Tripolar Audio" in which front surface drivers (200R, 200L) play equally loudly and the seat's occupant hears additional Height channel or immersion cues (e.g., such as Dolby™ ATMOS™ channel content, and so provide immersive audio for the front seat occupants and, optionally an audio (e.g., center channel) signal is provided for the rear-facing speaker 200B for rear seat occupants. Finally, FIG. 6D illustrates the mode called "Centre-Rear" in which front surface drivers (200R, 200L) play less loudly and the seat's occupant hears low level audio and a strong focus center channel signal is provided through the rear-facing speaker 200B for rear seat occupants.

Figure 7:
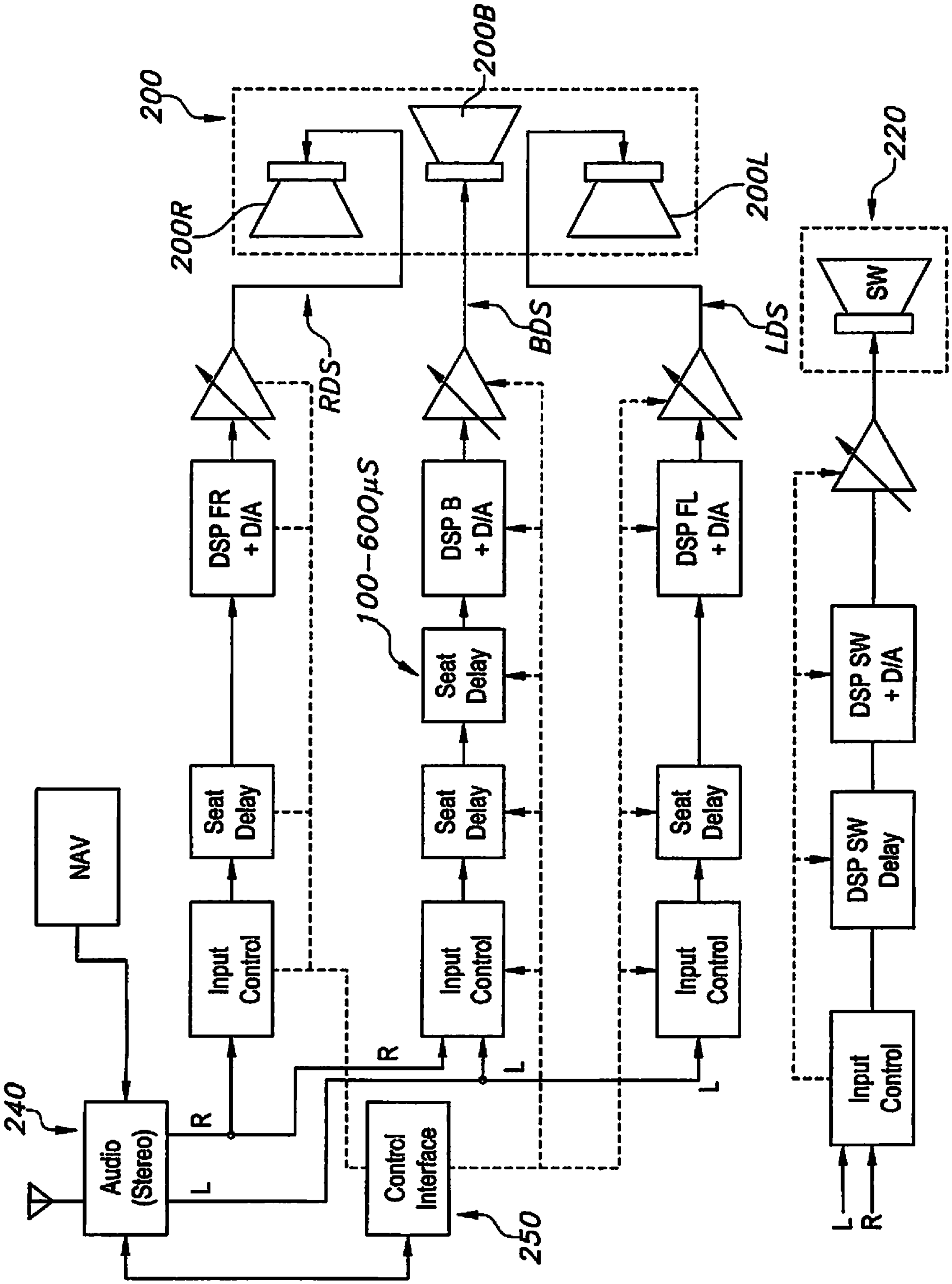
FIG. 7 is a block diagram illustrating signal processing and signal amplification interconnections for generating the tri-polar headrest transducer drive signals and the subwoofer drive signals for the automotive sound system configuration and method of the present invention.

Turning next to FIG. 7, there is shown an exemplary block diagram which illustrates signal processing and signal amplification interconnections for the automotive audio system 290 for generating the tri-polar headrest transducer drive signals (e.g., for driving the components within headrest assembly 200 or 500) and the subwoofer drive signals (e.g., for subwoofer assembly 220. FIG. 7, as a diagram is an example of a stereo downmix embodiment (for conciseness), and should not be construed as limiting. The system and method of the present invention is readily implemented in other formats. So, for example, FIG. 7 may be construed as illustrating a post down mix of a multi-channel (e.g., 7.1.x) bitstream format.

As noted above, prototype Digital Signal Processing ("DSP") method steps programmed into audio system 290 and tri-polar signal processing interface 150 include:

(a) Computing, generating and Imposing a first "seat delay" time delay on the unique first and second transducer drive signals (RDS, LDS) for each front headrest's front/lateral driver or transducer pair (e.g., 200R, 200L) corresponding to the physical (front to back) separation of the front/lateral drivers (most precisely their acoustic centers) and the unique third transducer drive signal "FTB delay" for the rear facing driver 200B. By synchronizing the front and rear oriented sound radiation with such time delays, the amplitude response at the passengers' ears is made substantially smoother through the crossover passband than it would be otherwise (see, e.g., Polk Audio's "Isonic™" U.S. Pat. No. 7,817,812 disclosure, the entirety of which is incorporated by reference here).

That front-to-back time ("FTB") delay value is computed from the formula $$t\ (\text{u-sec})=[d\ (\text{mm})/343]\times 10^6 \quad \text{(Eq. 1)}$$

For example, for a separation distance of 50 mm (approx. 2.0 in) between the planes of the front/lateral and rear drivers' acoustic centers (e.g., between a first front side vertical plane through the acoustic centers of the front facing drivers (e.g., 200L, 200R or 500L, 500R) and a second rear-side vertical plane through the acoustic center of the rear facing driver (e.g., 200B or 500B), a front to back ("FTB") synchronization interval delay of 146 micro-seconds imposed on the back driver's transducer drive signal BDS substantially synchronizes the front/lateral drivers with the rear-facing driver for a front-seat passenger. Continuing with other headrest assembly size examples, for a separation distance of 100 mm (approx. 4 in) between the planes of the front/lateral and rear drivers' acoustic centers, a FTB delay of about 290 micro-seconds imposed on the back driver's transducer drive signal BDS substantially synchronizes the front/lateral drivers with the rear-facing driver for a front-seat passenger; and for a separation distance of 200 mm (approx. 8 in) between the planes of the front/lateral and rear drivers' acoustic centers, a FTB delay of about 580 micro-seconds imposed on the back driver's transducer drive signal BDS substantially synchronizes the front/lateral drivers with the rear-facing driver for a front-seat passenger. Accordingly, it is anticipated that for the intended headrest assemblies (e.g., 200, 500) the front to rear synchronization interval will be in the range of 100 to 600 microseconds. This front to rear synchronization interval (FTB, in the range of 100 to 600 microseconds) is in addition to any DSP Seat delay incorporated into the unique first and second transducer drive signals (RDS, LDS) for the front/lateral drivers of the headrest assembly.

(b) The next signal processing step in the DSP method of the present invention is adjusting and optimizing the delays in the unique first, second and third transducer drive signals distinctly or differently for front passengers (e.g., in Row A) and for rear passengers (in Row B), which includes:

(b1) adjusting (via DSP) the unique first, second and third transducer drive signals with a unique Seat Delay for each Front/lateral and/or rear facing transducer, and (b2) imposing further separate or additive delays in accordance with other speakers (e.g., 220) placed about the vehicle's passenger compartment to optimize front or rear seat passenger's experience with respect to audio performance. In particular, low-frequency transducers/sub-systems (e.g. subwoofer 270) are located relatively far from the passenger and the associated headrest audio sub-system 200. In order to synchronize the time of arrival of said loudspeaker sub-systems' acoustic radiation, appropriate delays are imposed on elements of the headrest loudspeaker system in accordance with acoustic synchronization and providing optimal temporal/spatial cues for optimal imaging.

(c) Another optional signal processing step in the DSP method of the present invention is optimizing the aimed radiation pattern of headrest transducers with waveguides and/or acoustic absorption elements (see, e.g., FIGS. 4A and 4B). By controlling the directivity pattern (generally, increasing Directivity Index), the tri-polar headrest assembly (e.g., 200 or 500) will "service" the intended seat/headrest occupant while minimizing "cross-talk" with other headrest system(s) in the vehicle. Further, acoustic efficiency is improved by focusing radiated sound towards the seat/headrest occupant's ears which reduces the electrical power required for achieving a given sound pressure level.

(d) Another (optional) signal processing step in the DSP method of the present invention is Generating, for the driver, Nav/GPS directional cues (see, e.g., FIGS. 6A and 6E) which are played through selected transducers into a driver's selected ear (e.g. "turn left" is directed to the driver's left ear) while other occupants enjoy uninterrupted audio.

(e) Another (optional) signal processing step in the DSP method of the present invention is Employing Interaural crosstalk cancellation (IACC) techniques for reducing the sound at the ear locations of the opposing headrest speaker's acoustic output to further enhancing spatial cues, especially for NAV/GPS prompts. For example, a "turn left prompt" presented to the driver's left ear would, in the absence of IACC, would "leak" to the right rear thereby diminishing the intended "hard left" spatial aspects of the prompt. By introducing an attenuated, phase inverted replica to the right ear with an appropriate time delay in accordance the distance between the driver's ears, the intended left-ear spatial cue may be greatly enhanced. Additional processing on the IACC "effect" shall include bandpass filtering to substantially include the 400-4 kHz decade. This sort of signal processing is just exemplary. There are other signal processing options for creating filtered, delayed (phase adjusted) signals which can be projected to acoustically combine or be superposed in the space of the vehicle's interior to create selected phantom sonic images for selected passengers, as different vehicle audio system applications may require (see, e.g., Polk Audio's U.S. Pat. Nos. 9,374,640 and 10,327,064, the entire disclosures of which are incorporated herein by reference). The sound-field for each rear seat occupant is preferably optimized in part by use of the central, rearward firing loudspeaker in the seat ahead of the occupant.

The DSP settings and configuration for each tri-polar headrest assembly (e.g., 200 or 500) are selectively optimized for each of the front seat occupants or rear seat passengers. For example, optimizing for the front seat occupant in the right side passenger seat of Row A entails appropriate amplitude response adjustments in the unique first, second and third transducer drive signals for that passenger's headrest assembly, including inverse head related transfer function (HRTF) adjustments associated with height effects and/or headrest sound absorption and diffraction. By comparison, when the front headrest's rear oriented loudspeaker is serving the rear passengers, alternative amplitude shaping may be imposed. Finally, for the ultimate ("limo mode") rear seat experience, the outer front oriented loudspeakers each play an appropriate cancellation signal (phase reversed, attenuated and bandpassed) to effectively provide a center-located phantom center channel for each rear seat passenger.

Turning again to the diagrams of FIGS. 6A-6E, four separate use modes for the automotive sound system 290 and the tri-polar headrest assembly (e.g., 200 or 500) are illustrated, including use-specific unique first, second and third transducer drive signals for different use cases or situations, in accordance with the method of the present invention. FIG. 6A illustrates a use mode entitled "Foreground Audio" (or "F-A mode") for the automotive sound system 290 and tri-polar headrest assembly (e.g., 200 or 500), in a situation where the vehicle's audio system is responding to a nav system (e.g., as might be incorporated in or communicate with head unit 240) including use-specific unique first, and second transducer drive signals for the driver's headrest assembly. For the driver, when being notified to make a left turn, the unique first transducer drive signals is controlled to make the "turn left" instruction play solely through the front left driver (e.g., 200L or 500L) and at a louder volume or signal level than is generated for the other unique second and third transducer drive signals, thereby giving the driver a directional cue which is focused toward the driver's selected (e.g., left) ear when the directional cue is leftward. In this situation, there is no audio signal provided for Row B or Row C speakers, as shown in FIG. 6A.

FIG. 6B illustrates a use mode entitled "Headrest Audio" (or "HA mode") for the automotive sound system 290 and tri-polar headrest assembly (e.g., 200 or 500), in a situation where the vehicle's audio system is optimized for audio (e.g., stereo) playback for front seat (i.e., Row A) occupants including generation of First Row optimized audio playback specific unique first and second transducer drive signals for the driver's headrest assembly and the front row passenger's headrest assembly. The first and second drivers pointing forwardly (e.g., 200L, 200R or 500L, 500R) from each front seat occupant are driven with unique first and second transducer drive signals, but there is no drive signal generated for or used to energize the rear facing drivers (e.g., 200B, 500B). In this situation, there is no audio signal provided for Row B or Row C speakers, as shown in FIG. 6B.

FIG. 6C illustrates a use mode entitled "Tri-Polar Audio" (or "TA mode") for the automotive sound system 290 and tri-polar headrest assembly (e.g., 200 or 500), in a situation where the vehicle's audio system is optimized for playback for front seat (i.e., Row A) and rear seat (e.g., Row B) occupants. In this mode, the front seat occupants experience additional height and immersion audio cues during playback, and rear seat occupants hear a "center" signal (e.g., as, those terms are used in home theater audio signal processing systems such as Dolby's Atmos® system). In this mode, as illustrated in FIG. 6C, the unique first, second and third transducer drive signals are generated for the driver's headrest assembly and the front row passenger's headrest assembly. The first and second drivers pointing forwardly (e.g., 200L, 200R or 500L, 500R) from each front seat occupant are driven with unique first and second transducer drive signals, and a third unique drive signal is generated to energize the rear facing drivers (e.g., 200B, 500B).

FIG. 6D illustrates a use mode entitled "Center-Rear" (or "C-R mode") for the automotive sound system 290 and tri-polar headrest assembly (e.g., 200 or 500), in a situation where the vehicle's audio system is optimized for playback for the rear seat (e.g., Row B) occupants. In this mode, the front seat occupants experience a reduced "Low-level" audio playback level or volume generated by unique first and second transducer drive signals for the driver's headrest assembly and the front row passenger's headrest assembly of Row A. This differs significantly from unique third transducer drive signals generated for rea-facing drivers (e.g., 200B, 500B) incorporated in the driver's headrest assembly and the front row passenger's headrest assembly which are aimed rearwardly toward Row B occupants which hear a strong focus "center" signal. In this mode, as illustrated in FIG. 6D, the unique first, second and third transducer drive signals are generated for the front row (e.g., Row A driver's headrest assembly and passenger's headrest assembly) with the third unique drive signal generated at a higher amplitude or volume level to energize the rear facing drivers (e.g., 200B, 500B). For the ultimate ("limo mode") rear seat experience, the outer front oriented loudspeakers in each tri-polar headrest assembly can each be driven with a unique transducer drive signal to play an appropriate cancellation signal (phase reversed, attenuated and bandpassed) to effectively provide a sound field including a center-located phantom center channel for each rear seat passenger. In this Limo mode, Left and Right channel signals may also be provided with selectable spatialization for wide stereo effects with virtualized height and surround channel reproduction.

Having described preferred embodiments of a new and improved automotive audio system and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An automotive audio system electrodynamic acoustic transducer, comprising:

a pole piece having a first end terminating distally in a distal end surface;

a voice coil comprising wire windings configured to receive electrical current, the voice coil being configured to move along the first end of the pole piece;

a magnetic structure comprising parts defining an air gap in which the voice coil is disposed, the magnetic structure being configured to create a magnetic field in which the voice coil is configured to move along the first end of the pole piece;

a diaphragm comprising a central portion with an inner periphery and an outer periphery, the inner periphery of said diaphragm defining a central opening and being attached to the voice coil to move with the voice coil;

a floating or suspended bulbous waveguide member spaced from and suspended before the distal end surface of the pole piece, the waveguide member having a circumference that projects radially to a larger diameter than the pole piece to project laterally over an inner radiating area of the diaphragm;

an acoustically transparent mesh or grill structure that supports the waveguide member in an orientation which is centered along a central aiming or excursion axis of the automotive audio system electrodynamic acoustic transducer;

wherein the waveguide member has a proximal smaller diameter circular surface separated by a waveguide member axial thickness from a distal smaller diameter circular surface, with a central larger diameter central segment defining a larger diameter peripheral edge that is integrally molded with or mounted to the acoustically transparent mesh or grill structure;

wherein the waveguide member is suspended apart from the distal end surface of the pole piece to provide a gap or cavity defined by a volume of air in front of the distal end surface of the pole piece;

wherein the distal end surface of the pole piece is covered or occluded; and wherein the automotive audio system transducer is configured such that, in operation, a substantial portion of sound within the gap or cavity is absorbed and attenuated to reduce destructive interference.

2. An automotive audio system electrodynamic acoustic transducer comprising:

a pole piece having a first end terminating distally in a distal end surface;

a voice coil comprising wire windings configured to receive electrical current, the voice coil being configured to move along the first end of the pole piece;

a magnetic structure comprising parts defining an air gap, wherein the voice coil is disposed in the air gap so that the magnetic structure is configured to create a magnetic field in which the voice coil is configured to move along the first end of the pole piece;

a diaphragm comprising a central portion with an inner periphery defining a central opening and an outer periphery, the inner periphery of the diaphragm being attached to the voice coil to move with the voice coil;

a floating or suspended bulbous waveguide member spaced from and suspended apart from the distal end surface of the pole piece, the waveguide member having a circumference that projects radially to a larger diameter than the pole piece to project laterally over an inner radiating area of the diaphragm;

a mesh or grill structure configured to cause the waveguide member to float within and be supported in an orientation which is centered along a central aiming or excursion axis of the automotive audio system electrodynamic acoustic transducer;

wherein the waveguide member has a proximal smaller diameter circular surface separated by a waveguide member axial thickness from a distal smaller diameter circular surface, with a central larger diameter central segment defining a larger diameter peripheral edge;

wherein the mesh or grill structure suspends the waveguide member apart from the distal end surface of the pole piece to provide a gap or cavity defined by a volume of air between the waveguide member and the distal end surface of the pole piece;

wherein the distal end surface of the pole piece is covered or occluded; and wherein the automotive audio system transducer is configured such that, in operation, a substantial portion of sound within gap or cavity is absorbed and attenuated to reduce destructive interference.

3. An automotive audio system electrodynamic acoustic transducer comprising:

a pole piece having a first end terminating distally in a distal end surface;

a voice coil comprising wire windings configured to receive electrical current, the voice coil being configured to move along the first end of the pole piece;

a magnetic structure comprising parts defining an air gap, wherein the voice coil is disposed in the air gap so that the magnetic structure is configured to create a magnetic field in which the voice coil is configured to move along the first end of the pole piece;

a diaphragm comprising a central portion with an inner periphery defining a central opening and an outer periphery, the inner periphery of the diaphragm being attached to the voice coil to move with the voice coil;

a waveguide member spaced from and suspended before the distal end surface of the pole piece, said waveguide member having a circumference that projects radially to a larger diameter than the pole piece to project laterally over an inner radiating area of the diaphragm;

a mesh or grill structure configured to cause the waveguide member to float within and be supported in an orientation which is centered along a central aiming or excursion axis of the automotive audio system electrodynamic acoustic transducer;

wherein the waveguide member has a proximal smaller diameter circular surface separated by a waveguide member axial thickness from a distal smaller diameter circular surface, with a central larger diameter central segment defining a larger diameter peripheral edge;

wherein the mesh or grill structure suspends the waveguide member apart from the distal end surface of the pole piece to provide a gap or cavity defined by a volume of air between the waveguide member and the distal end surface of the pole piece;

wherein the distal end surface of the pole piece is covered or occluded; and wherein the automotive audio system transducer is configured such that, in operation, a substantial portion of sound within gap or cavity is absorbed and attenuated to reduce destructive interference.

* * * * *